April 30, 1935.　　　M. S. TOWSON　　　1,999,220
INDUSTRIAL TRUCK
Filed March 11, 1930　　　3 Sheets-Sheet 2
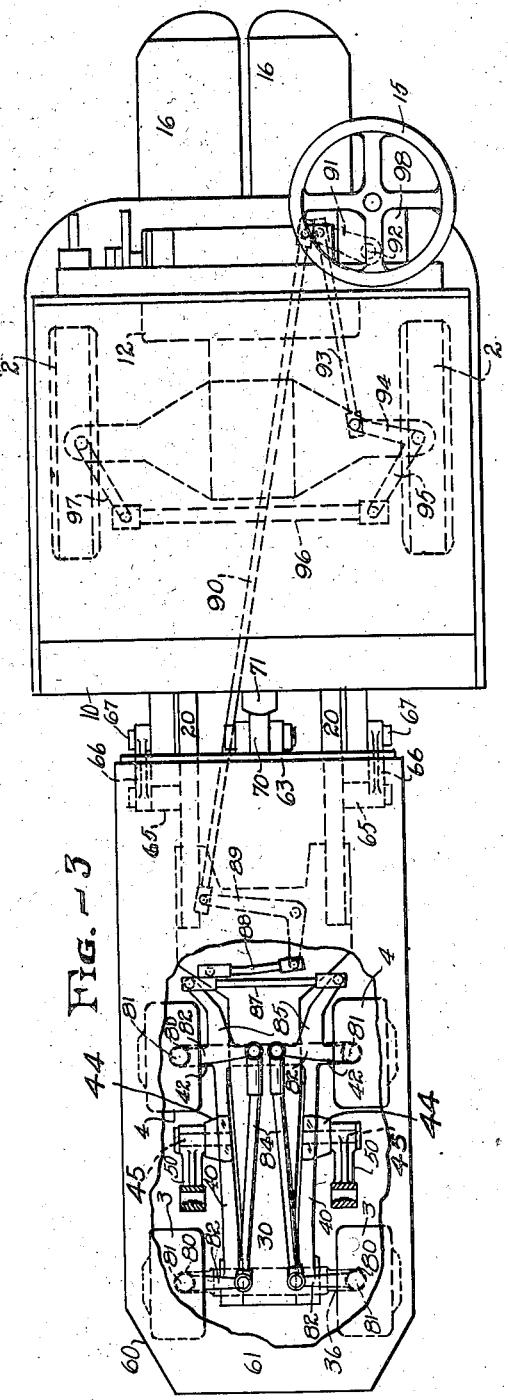
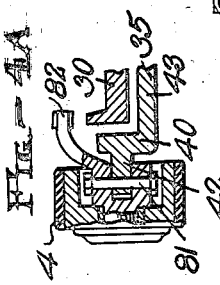
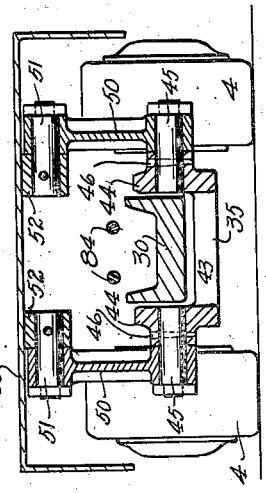
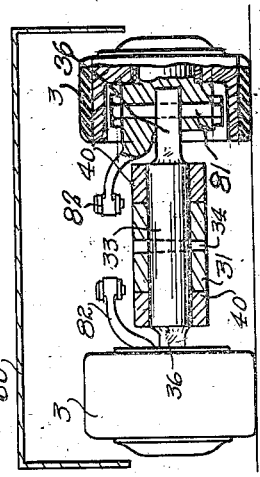
Inventor
Morris S. Towson
By Bates, Goldrick & Teare
Attorneys

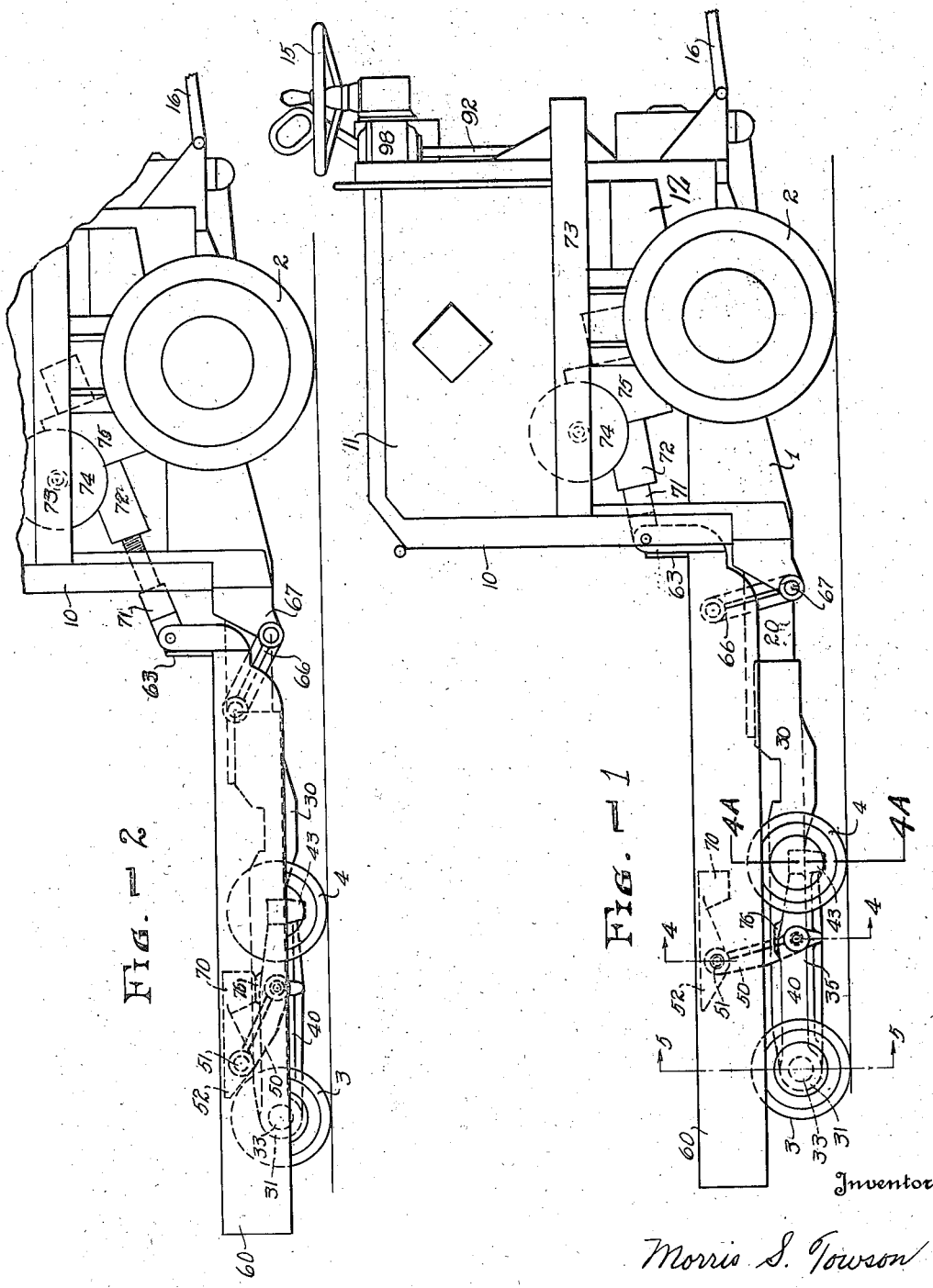

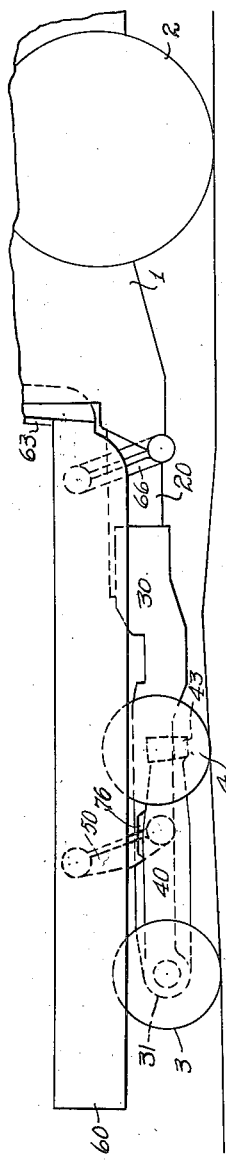

Patented Apr. 30, 1935

1,999,220

UNITED STATES PATENT OFFICE 1,999,220

INDUSTRIAL TRUCK

Morris S. Towson, Shaker Heights, Ohio, assignor, by mesne assignments, to Sheldon K. Towson, Cleveland Heights, Ohio Application March 11, 1930, Serial No. 434,995

17 Claims. (Cl. 180—22)

This invention relates to improvements in load transporting mechanisms and is especially adaptable to transport comparatively heavy loads. The illustrated embodiment thereof is shown as being a truck of the elevating platform type, such as are used for handling loads of material in and about industrial plants.

The general object of this invention is the provision of an industrial truck capable of handling loads of varying weights, in a manner to distribute such load over a plurality of pairs of load bearing wheels.

Another object of the invention is to provide an industrial truck adapted for lifting a load from a position comparatively close to the ground, transporting such load over uneven surfaces without causing excessive twisting strains to be set up in the truck chassis and without undue wear on the wheel treads.

A further object of the invention is to provide an industrial truck with a plurality of pairs of load bearing wheels, spaced to lie beneath a load bearing platform and to provide a mounting for such wheels wherein the overall height will permit a load to be picked up from a position comparatively close to the ground.

Another object of the invention is to provide a wheel mounting for a plurality of pairs of load bearing wheels, wherein the load will be distributed over all the wheels when the truck is driven over uneven surfaces.

Another object is to provide an articulated supplemental frame construction for a vehicle having an elevated platform, wherein such supplemental frame may be pivotally mounted to the load elevating platform and to permit relative movement between the chassis and the wheel mounting.

Further objects and features of the invention will become apparent from the following description relating to the accompanying drawings, and the essential novel characteristics will be summarized in the claims.

In the drawings, Fig. 1 is a side elevation of an industrial truck having a lift platform, and embodying my invention; Fig. 2 is a side elevation of the truck illustrated in Fig. 1, showing the lift platform in a different position; Fig. 3 is a plan view of the truck wherein a portion of the elevated platform is broken away to show more clearly the wheel mounting and the chassis construction; Figs. 4, 4A and 5 are transverse vertical sections through the wheel mountings and chassis and are indicated by the lines 4—4, 4A—4A, and 5—5 respectively on Fig. 1; Fig. 6 is a side elevation partially broken away, illustrating the articulated chassis and wheel mounting; Figs. 7 and 8 are fragmentary side elevations, diagrammatically illustrating different operation capabilities of a wheel mounting constructed according to my invention.

Referring again to the drawings wherein a preferred embodiment of a truck, designed for carrying comparatively heavy loads, is illustrated, there is a main chassis or frame 1, having mounted thereon at its forward end a pair of driving wheels 2 and adjacent its rear a pair of relatively small load bearing wheels 3 and 4. All of the wheels in the embodiment illustrated are dirigibly arranged so as to turn about individual vertical axes, thereby permitting the truck to be turned about a small turning radius.

Standing upwardly on the forward end of the truck chassis is a frame structure, generally indicated at 10 and which comprises a suitable support for a battery and motor, or other power supply, and certain of the operating controls. In the embodiment illustrated, a housing 11, mounted in the upper portion of the framework 10 encloses a suitable battery and disposed beneath the housing is a motor 12 having suitable driving connections, including gears and differential mechanism, to drive the driving wheels 2.

The various operator's controls include a steering wheel 15 and pivoted platform members 16, which extend forwardly from the truck frame structure 10.

Rigid with the frame and extending rearwardly therefrom are a pair of sill members 20, which, as shown, comprise comparatively deep webbed channel shaped members. The portion of the frame chassis which supports the platform or load lifting mechanism comprises, in the embodiment shown, a comparatively heavy centrally disposed frame extension member enlarged horizontally at the end adjacent the frame sills 20 and rigidly secured thereto. The chassis frame extension 30 is made with as minimum a depth as is consistent with strength and rigidity of the structure. The rear portion or that farthest away from the sills is made comparatively narrow to permit the dirigible wheels to lie close to the center of the truck and not extend beyond the platform edges.

Toward the rear of the chassis extension is a boss portion 31 in which is mounted a shaft 33, secured against rotation by a suitable pin 34. The shaft 33 serves as a support for a supplemental frame member 35, as will be hereinafter described, and has outwardly extending portions 36 which are adapted to support the rear wheels 3.

The supplemental frame 35 comprises a pair of longitudinally extending members 40 which are pivoted to the shaft 33, adjacent the chassis extension member 30. The arms 40 extend forwardly from the shaft 33 adjacent the chassis extension 30 and carry at their forward ends outward extensions 42 on which the wheels 4 are mounted. The arms 40 are joined at their forward ends by means of a suitable cross member 43.

Rigid with the arm 40 and located slightly forward of its mid-point and between the two wheels 3 and 4 are boss portions 44, which carry outwardly extending stub shaft members 45 (Fig. 4), secured against rotation in the arms 40 by suitable pins 46. Pivoted to the shafts 45 adjacent the arms 40 are links 50, the other ends of which are pivoted to shafts 51, rigidly secured to bearing members 52 mounted on the underside of a platform 60 of the truck. The platform 60 may be considerably modified. As shown, it comprises a substantially rectangular member, flanged downwardly at all its edges for strength and has a flat central load supporting surface 61, entirely overlying the whole under carriage structure. The platform has at its forward edge a stiffening member 63. On its underside near its forward ends it has downwardly extending brackets 65. The brackets are connected to the main frame by a pair of spaced links 66, pivoted at their opposite ends to brackets 65 and frame members 67 of the main frame 1.

A suitable power mechanism for swinging the platform 60, to raise and lower the same, may comprise a ram bar 71 mounted in a housing 72, which is pivotally carried by a frame member 73 of the frame 10. A motor 74 and suitable gearing (not shown), contained within the housing 75 acts to draw the ram bar inwardly to raise the platform to the position shown in Figs. 1 and 6, or to thrust the ram bar outwardly to lower the platform to the position shown in Fig. 2.

It will be seen from the foregoing description that as the platform is raised, the supplemental frame being in normal position, the links 50 and 66 are substantially parallel. When the platform is in its lowered position, its forward end rests upon the sill members 20, and a boss 70 rigidly secured to the platform adjacent its rear end, rests on suitable bosses 76 of the supplemental frame members 40, thereby supporting the platform.

When the platform is in its raised position it is supported entirely by the links 50 and 66, while the ram 71 and its associated driving unit, act to retain the platform in such raised position. It will be noted that in the raised position, the wheel mounting members 40 are free to turn about the axis of the shaft 33, the links 66 and the platform swinging slightly to compensate for the movement of the wheel mounting. This movement is comparatively slight and therefore does not materially affect the platform itself, and retains the load in position on the platform 60, supported by the links 50 and 66, and permits the wheels 3 and 4 to follow the contour of the ground, as illustrated in Figs. 7 and 8.

Each of the wheels 3 and 4 are provided with steering knuckle members 80, which are bifurcated in the usual manner to embrace the outwardly extending portions 36 of the shaft 33 (Figs. 3 and 5) and the extending portions 42 (Figs. 3 and 4A) of the supplemental frame members 40, and are secured thereto by suitable vertical pins indicated at 81. Each steering knuckle is provided with an inwardly extending arm 82 which passes over the top of the chassis extension 30 with adequate clearance to permit relative movement between the arms and the chassis. In the embodiment illustrated, the arm 82 of the steering knuckle of each load bearing wheel 3 is joined by suitable ball and socket connections to one end of a tie bar 84, the other end of which is joined by a ball and socket connection to the arm 82 of the steering knuckle of the load bearing wheel 4, lying on the corresponding side of the chassis.

The steering mechanism, in addition to the arms 82 and tie rods 84, comprises arms 85, rigid with the arms 82 of the wheels 4 and which are connected together by a tie rod 87, having suitable ball and socket connections. The rod 87 is connected by means of ball and socket joints to a link 88, which is connected to one end of the bell crank 89. The other end of the bell crank 89 is connected by means of a ball joint to one end of a rod 90, which reaches forwardly and at its forward end is connected by means of a ball joint to a lever 91, mounted on the steering column 92.

The movement of the arm 91 also operates through a link 93 to move the steering knuckle 94 of one of the forward or driving wheels 2, and through the medium of an arm 95, rigid with the steering knuckle 94 and a tie rod 96, operates the steering knuckle 97 of the other wheel 2.

The steering column 92 is connected by means of suitable gearing, housed in a casing 98 to the steering wheel 15. The rotation of the wheel 15 by the operator operates to turn the wheels 2, 3 and 4 about their vertical axes to simultaneously steer the truck.

It will be noted that the arrangement is so designed that the wheels may swing an adequate amount for turning a comparatively sharp corner, notwithstanding the fact that the wheels are in the same plane as the hub formations on the supplemental frame and the chassis. The arrangement of the arms and links throughout the entire steering mechanism, is such that the axis of each wheel intersects the axes of all of the other wheels at a common turning locus, which, depending on the length of the turning radius, moves along a turning loci extending transversely of the truck at a point intermediate its ends.

From the above description, it will be seen that I have provided an industrial truck having a supplemental frame support for a relatively low lift platform, wherein there is a suitable arrangement of small load bearing wheels, and which truck will support and transport comparatively heavy loads.

It will also be seen that I have provided an industrial truck having a platform disposed over a low swung portion of the frame, wherein the platform may be lowered to receive a load and thereafter raised to transport the load, and wherein there is a double pivotal connection between the wheel mounting and between the chassis and the platform, which permits the wheel mounting to rock relative to the chassis and platform.

It will be understood that each portion of the arrangement shown and described may be modified with reference to the remaining portions without departing from the scope of the invention.

It will also be apparent to those skilled in the art that my invention is not necessarily confined to the industrial truck art but is adaptable to a variety of forms.

I claim:

1. In a truck, the combination of a load elevating platform, a main frame, a supplemental frame having a plurality of pairs of load bearing wheels pivotally connected to said main frame, said platform being supported at one end by means connected to the main frame, and at the other end by means connected to the supplemental frame, intermediate the axes of said pairs of wheels.

2. In an industrial truck, the combination of a main frame, a pair of driving wheels mounted on the main frame near the forward end of said frame, a pair of load bearing wheels mounted on the main frame near the rear end of said frame, a supplemental frame pivoted to said main frame, the axis of said pivot coincident with the axis of said load bearing wheels, a pair of load bearing wheels mounted on the supplemental frame, an elevating platform overhanging both of said frames and wheels, and means pivotally connecting said supplemental frame with the overhanging platform.

3. In an industrial truck, the combination of a main frame, a pair of driving wheels mounted near the forward end of said frame, a pair of load bearing wheels mounted on the main frame adjacent the rear end of said frame, a forwardly extending supplemental frame pivoted to the rear portion of said main frame, a pair of load bearing wheels mounted on said supplemental frame, an elevating platform overhanging both of said frames, and pivotal means connecting said supplemental frame with the overhanging platform, whereby there may be relative movement between the platform, the supplemental frame and the main frame when the platform is in its elevated position, and independent of the elevating movement of the platform.

4. In an industrial truck, a main frame, a pair of driving wheels supporting one end of the frame, a supplemental frame pivotally connected to the main frame adjacent the opposite ends thereof, a load elevating platform, means pivotally connecting one end of the platform with the main frame, a second pivot means connecting the platform intermediate its ends with the supplemental frame, said last named means being spaced from the pivotal connection between the supplemental frame and the main frame, means to rock the platform to an elevated position about said means, and wherein the platform is supported intermediate its ends by the supplemental frame thereby relieving the main frame of the greater portion of the load.

5. In an industrial truck, a main frame, a pair of supporting wheels mounted on the forward end of said frame, a pair of supporting wheels mounted on the main frame adjacent the rear end of said frame, a supplemental frame member having one end thereof pivoted to the main frame, a pair of load-bearing wheels mounted on the supplemental frame adjacent the end opposite the connection to the main frame, a load-engaging member having a pivotal connection with the main frame, and means connecting the load-engaging member with the supplemental frame to transfer the weight of the load thereon to the supplemental frame and permit the supplemental frame to rock relative to the main frame.

6. In a truck, a main frame, a supplemental frame pivotally connected to the main frame, wheels to support said frames, an elevatable platform, swingable means permanently connecting one end of said platform to the main frame, and swingable means permanently connecting the other end of said platform with the supplemental frame.

7. In a truck, the combination of a load elevating platform, a main frame, a supplemental frame, a connection between the supplemental frame and the main frame to permit relative movement therebetween, said platform being supported in an elevated position by an operable means permanently connected to one end of the platform and to the main frame and by means connecting the other end of the platform with the supplemental frame, and means independent of both aforesaid means to support one end of the platform directly on the main frame and the other end of the platform directly on the supplemental frame when the platform is in its lowered position.

8. In an industrial truck, a main frame, a supplemental frame pivotally secured to said main frame, load-bearing wheels to support said frames, an elevatable load-engaging platform supported on said frames by a plurality of links, one of said links pivotally connecting one end of the platform to the main frame, and another of said links pivotally connecting the other end of the platform to the supplemental frame.

9. In an industrial truck, a main frame, a supplemental frame pivotally connected to the main frame, a load-engaging platform, parallel links arranged to support the platform from said frames, one of said links being pivotally connected to one end of the platform and to the main frame, and the other of said links being pivotally connected to the other end of the platform and to the supplemental frame.

10. In an industrial truck, a main frame, a supplemental frame pivoted at one end to the main frame, load-bearing wheels to support said frames, a load-engaging and supporting platform disposed above the supplemental frame, a pair of parallel links connecting the platform to the frames, wherein one of said links is pivoted directly to the main frame and the platform, and wherein the other of said links is pivoted directly between the supplemental frame and the platform independent of the main frame.

11. In an industrial truck, a main frame, a supplemental frame pivotally secured to the main frame, load-bearing wheels to support said frames, an elevatable load-supporting platform, means to elevate said platform, a permanent operative connection between one end of the platform and the main frame, a second permanent operative connection between the other end of the platform and the supplemental frame, and wherein said connections cooperate with said elevating means to raise both ends of the platform.

12. In an industrial truck, a main frame, a pair of wheels supporting said frame, a supplemental frame pivotally connected to the main frame adjacent one end thereof, a substantially horizontally extending load-engaging platform, operable means connecting one end of the platform with the main frame, a second operable means connecting the platform intermediately its ends with the supplemental frame, said last-named means being independent of the main frame, means to elevate said platform, and wherein said connecting means act to maintain the platform in substantially parallel planes during the raising and lowering movements.

13. In an industrial truck, the combination of a main frame, a pair of wheels mounted on the main frame near the forward end thereof, a pair of load bearing wheels mounted on said main frame near the rear end thereof, a supplemental frame pivoted to said main frame, a pair of load bearing wheels mounted on said supplemental frame, an elevatable platform overhanging both of said frames, raisable means independent of the main frame for pivotally connecting said supplemental frame with said platform, and raisable means independent of the supplemental frame for connecting the platform with the main frame.

14. In an industrial truck having an elevating platform, a truck frame having a low slung portion, said platform being attached to the truck frame at the inner end thereof by link members, a supplemental frame, a second pair of link members connecting the platform with the supplemental frame, means pivotally connecting one end of the supplemental frame with the main frame, a pair of wheels supporting the supplemental frame, an axle member having its axis coincident with said pivot means and mounted in both the main and supplemental frames, a second pair of load bearing wheels carried by said axle member, wherein the load on the main frame goes to the axle member and thence to the last-named wheels independent of the supplemental frame and wherein the load on the supplemental frame goes to said member and thence to said wheels independently of the main frame.

15. In an industrial truck having an upright frame portion and a low slung frame portion extending rearwardly from the upright portion adjacent the ground, driving wheels mounted on the truck frame adjacent the upright end thereof, an axle member mounted on the low slung portion adjacent the rear end thereof, a pair of relatively small wheels mounted on the axle member and supporting the low slung portion of the truck frame, an elevating platform overhanging the low slung portion of the truck frame, said platform being attached to the truck frame at the inner end thereof by link members, a supplemental frame pivotally mounted on said axle member, whereby said supplemental frame is pivoted to the low slung portion of the truck frame, a second pair of small wheels carried by said supplemental frame and a second pair of link members connecting the platform to the supplemental frame.

16. In an industrial truck having an upright frame portion and a low slung frame portion extending rearwardly from the upright portion adjacent the ground, driving wheels mounted on the truck frame adjacent the upright end thereof, an elevating platform overhanging the low slung portion of the frame truck, the forward end of said platform being attached to the truck frame by link members, a supplemental frame, a pair of relatively small load-bearing wheels supporting the supplemental frame, an axle member common to both the main and supplemental frames, a second pair of relatively small load-bearing wheels supporting said axle member, said supplemental frame being disposed between the four load bearing wheels, a link connecting the platform to the supplemental frame intermediate the small wheels, and means pivotally connecting one end of the supplemental frame to the low slung portion of the truck frame.

17. In an industrial truck, a main frame, a wheeled support therefor, an axle mounted on the main frame, a supplemental frame pivotally mounted on said axle, a pair of load bearing wheels to support said axle, wherein the load on the main frame is transmitted to the axle and thence to the wheels independently of the supplemental frame, and the load on the supplemental frame is transmitted to the axle and thence to said wheels independently of the main frame, a second set of wheels supportingly connected to the supplemental frame, a platform overhanging said frames, means pivotally connecting one end of the platform with the main frame independently of the supplemental frame, and means connecting the other end of the platform with the supplemental frame independently of the main frame.

MORRIS S. TOWSON.